United States Patent [19]

Wilson

[11] Patent Number: 4,470,501
[45] Date of Patent: Sep. 11, 1984

[54] PULLCORD LOCKOUT DEVICE FOR A CONVEYOR SYSTEM

[75] Inventor: Richard J. Wilson, Minneapolis, Minn.

[73] Assignee: The United States of America as represented by the Secretary of Interior, Washington, D.C.

[21] Appl. No.: 345,181

[22] Filed: Feb. 2, 1982

[51] Int. Cl.³ .............................................. B65G 35/00
[52] U.S. Cl. .................................. 198/854; 198/856; 24/71.1
[58] Field of Search ....................... 198/854, 856, 322; 24/71.1, 71.2

[56] References Cited

U.S. PATENT DOCUMENTS

| | | | |
|---|---|---|---|
| 507,454 | 10/1893 | Rogers | 24/71.1 |
| 2,449,031 | 9/1948 | Woodson | 24/71.1 |
| 2,645,330 | 7/1953 | Stephenson | 198/322 |
| 3,183,565 | 5/1965 | Schwarz | 24/71.1 |

*Primary Examiner*—Joseph E. Valenza
*Assistant Examiner*—Kyle E. Shane
*Attorney, Agent, or Firm*—Thomas Zack

[57] ABSTRACT

A lockout safety device used in combination with a conveyor pullcord system. The device is used to tension and then lock the conveyor system's pullcord in the tensioned position which action renders the conveyor inoperative. Several embodiments are disclosed each of which is portable, simple in structure, inexpensive, compact in size, and useable anywhere along the length of the pullcord. Each functions to cam its surface against and thereby tension the pullcord which then allows it to be locked in that position. In the preferred embodiment, two sets of parallel members are pivotably joined together with each set having a pin to engage the pullcord on one side while the pivot engages it on the other side.

1 Claim, 10 Drawing Figures

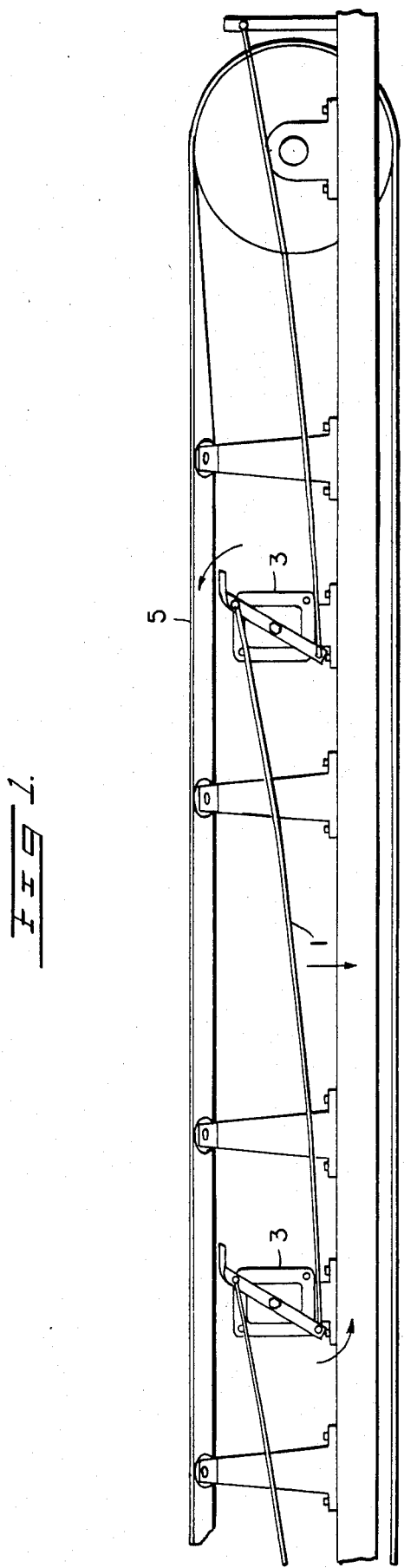

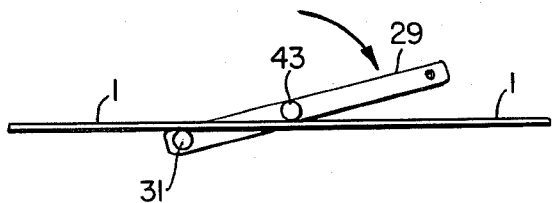
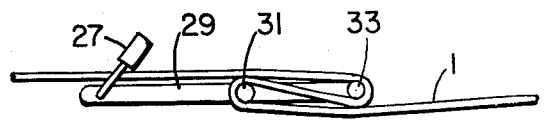
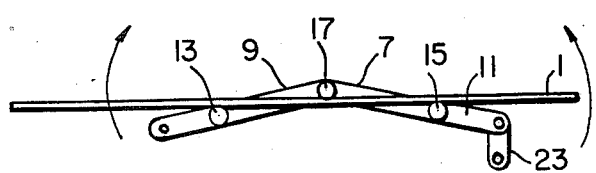
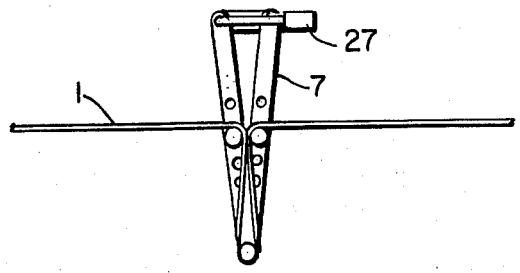
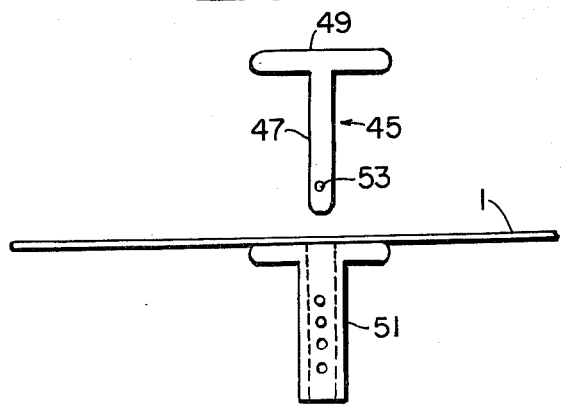
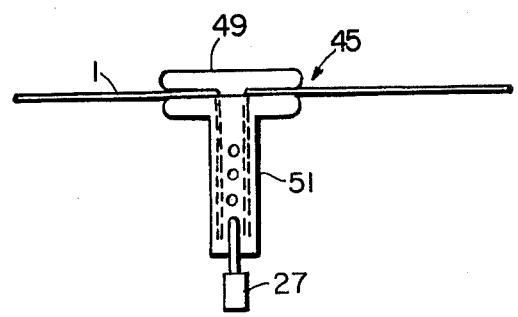

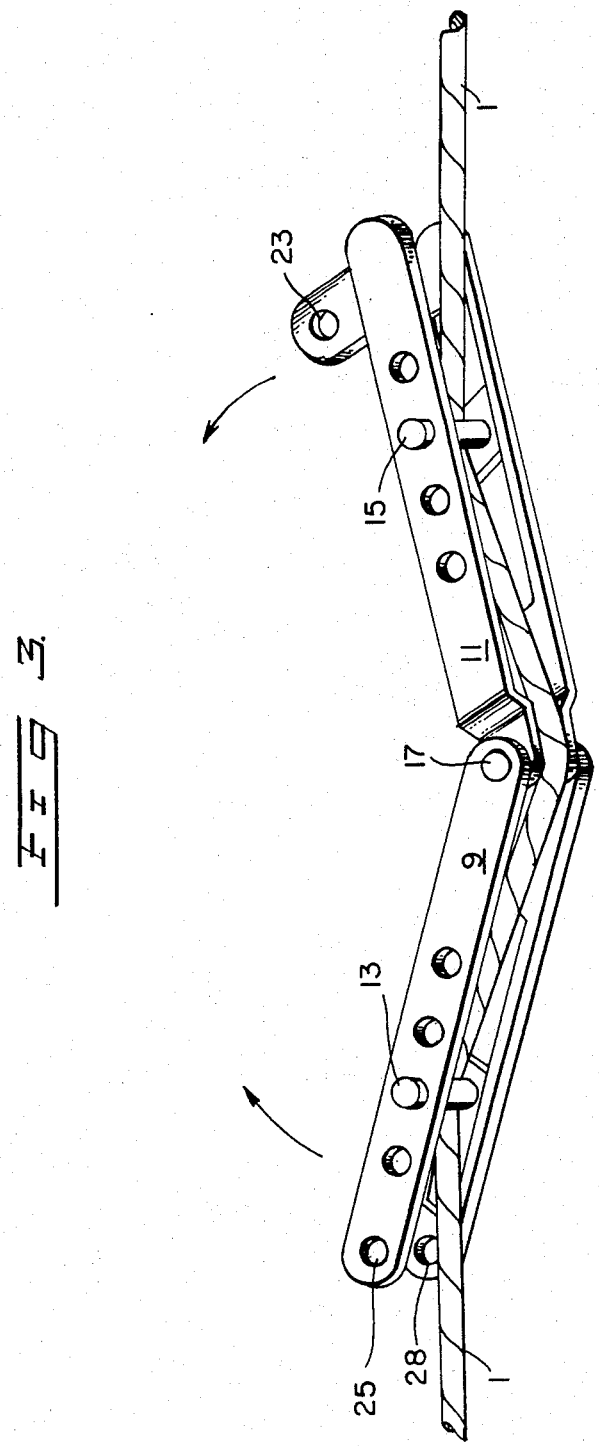

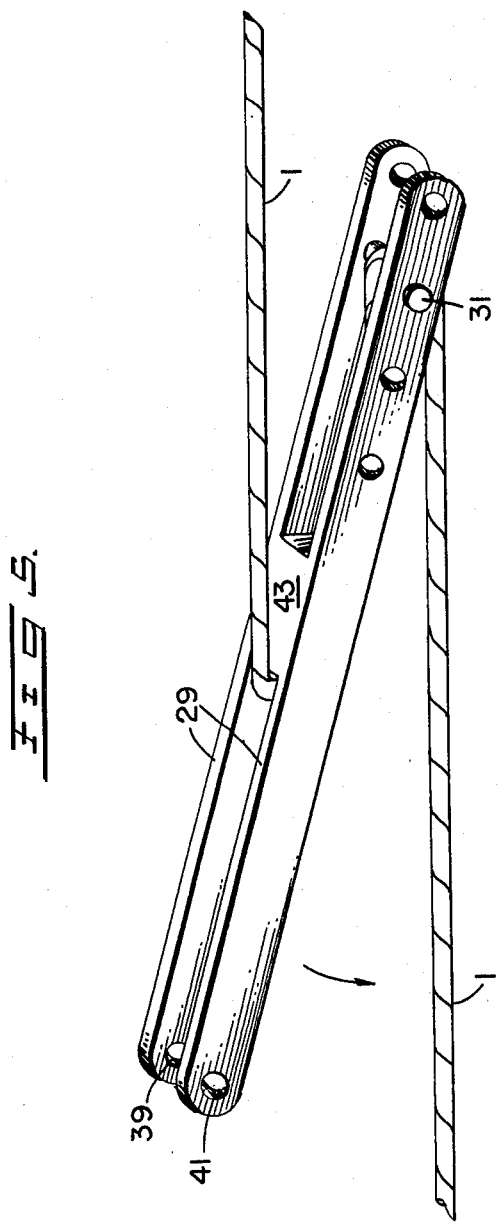

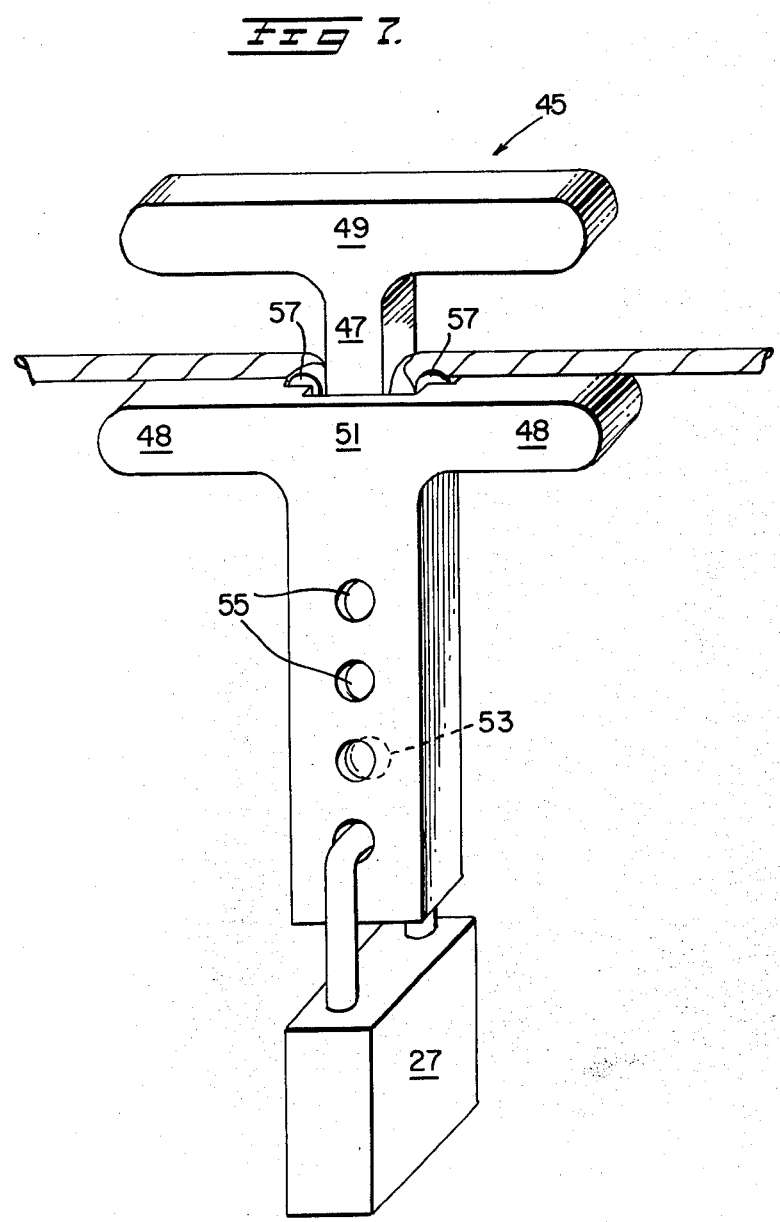

PULLCORD LOCKOUT DEVICE FOR A CONVEYOR SYSTEM

BACKGROUND OF THE INVENTION

The invention described herein is a lockout safety device and method which are used in conjunction with a pullcord to make a conveyor system inoperative.

DESCRIPTION OF THE PRIOR ART

In electrical power driven conveyor systems, a certain amount of maintenance and repair is normally required. Usually this work requires the conveyor system to be shut down and locked out to allow the necessary work to be completed in a safe manner. However, in many cases, the main switch mechanism is located some distance away from the point of repair in the system. Rather than go to the switch to deactivate the system, operators will, in many cases, attempt to make repairs while the belt is running or will stop the belt by means of the pullcord and attempt to make repairs without locking the belt to prevent inadvertent startup. Both situations present intolerable safety problems. My invention overcomes the hazards presented by these situations by providing a simple, compact, and inexpensive device which can be used to shutoff and lock out the conveyor system anywhere along its length when a pullcord shutoff system is present.

SUMMARY OF THE INVENTION

A lockout system for use with a conveyor emergency pullcord shutoff system. A pullcord is attached to a shutoff switch along the beltway. When the cord is placed in tension, the shutoff switch is activated and the conveyor is stopped. Several alternate embodiments are disclosed of devices which can place and keep the pullcord in a locked tension position which prevents restarting of the conveyor.

DESCRIPTION OF THE DRAWINGS

FIG. 1 is a schematic of a typical prior art conveyor system with a pullcord activated safety stop switch.

FIG. 2(a) and (b) depict a cross-sectional view of the preferred embodiment of the invention used to tension the pullcord of FIG. 1.

FIG. 3 is an enlarged perspective view of the FIG. 2 embodiment.

FIG. 4(a) and (b) illustrate a second embodiment of the invention in cross-sectional views.

FIG. 5 is an enlarged isometric view of the FIG. 4 embodiment.

FIG. 6(a) and (b) are still another embodiment of my invention also shown in cross-sectional views.

FIG. 7 is the enlarged view of the embodiment of FIGS. 6(a) and (b).

DESCRIPTION OF THE PREFERRED EMBODIMENT

FIG. 1 shows a more or less typical prior art pullcord 1 suspended between two identical shutoff switches 3. These switches in turn act to shut off the supply of power (usually electrical) to the motor of the conveyor 5. Normally, in a mining operation, the pullcord would be manually pulled downward (see direction of the arrow) by an operator, such as a miner, when an emergency occurred at the conveyor system. Routine maintenance or repairs to the system would or should be accomplished by first deactivating and locking out a main electric switch (not shown) to disable the conveyor system.

The preferred embodiment of FIGS. 2(a) and (b) and FIG. 3 is to be used with a conveyor system like the FIG. 1 system. Essentially it performs two functions. It tensions or kinks the pullcord 1 and it then locks the pullcord in that tensioned position. All three disclosed embodiments of the lockout device of our invention will accomplish both of these functions.

Referring to the drawings, especially FIG. 2(a), the lockout device 7 is shown engaging the pullcord. It consists of two pairs of parallel elongated solid members 9 and 11 with each pair having pin members 13 and 15, respectively, which engage the pullcord. These pin members extend perpendicular to the longitudinal extent of the elongated members and are retractable to allow the pullcord to fit through and are adjustable along the length of members 9 and 11 so as to accommodate different shutoff switches and pullcord tensions. As best shown in FIG. 3, a pivot pin 17 joins the two pairs of elongated members together in a pivotal manner. Solid backing members 19 and 21 (not shown) hold the elongated pair members in a spaced fixed relationship with respect to each other. The pivot pin fits through four aligned holes. Two of these holes are on the outer ending ears or tabs of member 9 and the other two are on the inner tabs of member 11. At the ends of each of the two pairs of members is a mechanism to allow the folded device to be locked upon itself (see FIG. 2(b)). This mechanism coulb be a tab member 23 with a hole therethrough on one set of members which fits between two similar tab/members 25 and 28 with holes therethrough on the end of the other pair of members 9. Initially (FIG. 2(a)) the pullcord is fitted such that the two pin members 13 and 15 are slipped over it and are on one side of it while the pivot rod pin 17 is on the other side. Next, the two leg members 9 and 11 are moved upward—the direction of the arrows—with their outer ends moving towards each other as they pivot around pin 17. This tensions the pullcord as the two rods and the pivot pin cam against it. Finally, as seen in FIG. 2(b), the holes in the three tabs 23, 25, and 28 are aligned and a conventional lock 27 inserted therethrough. The lock prevents removal of the tensioning device by other personnel until after the maintenance/repair work on the conveyor is completed.

The second embodiment of FIGS. 4(a)-(b) and 5 functions similarly to the preferred embodiment. It has a single pair of elongated parallel members 29 with a pin member 31 extending perpendicular therebetween at one end. The pin member 31 is retractable to allow the pullcord to fit through and is adjustable along the length of members 29 to accommodate different shutoff switches and pullcord tensions. At the other end holes 39 and 41, in members 29, allow the lock 27 to be inserted. A backing member 43 (shown as a pin in FIGS. 4(a) and (b)) joins the two elongated members 29 together and aids in tensioning the pullcord. As shown in FIG. 4(a), the safety device is initially inserted around the pullcord, with the pin member 31 on one side and the backing member 43 on the other, and rotated in the direction of the arrow. Next, FIG. 4(b), the kinked pullcord is locked and held in this position by the lock 27.

The third embodiment—FIGS. 6(a) and (b) and FIG. 7—function like the other two embodiments to tension and lock the pullcord in position. The cross-sectional views (FIGS. 6(a) and (b)) show the device is basically a blunt edged knife and scabbard type combination. The blunt edged knife 45 has an elongated blade 47 and handle 49 section. The scabbard 51 is wider than the blade 47 and also has a handle 48. In this way the blade may fit into the scabbard until it engages its handle 48. The tip of the knife has a blunt rounded camming surface with a hole 53 to allow the lock 27 to be inserted. FIG. 7 shows the scabbard holes 55 into which the lock 27 is inserted when aligned with the blade hole 53. After the round edge has pushed the pullcord down into the scabbard its desired depth and depending on the type of shutoff switch and the tension in the pullcord, the lock is inserted into a specific hole—the lower the hole the more tension being applied. Two small rollers 57 on either side of the scabbard's opening assist in this function and prevent undue wear on the pullcord.

Other devices may be used to tension the conveyor's pullcord and then lock it in place until the repairs and/or maintenance work has been completed. The three disclosed embodiments were selected because they were simple in construction, inexpensive, compact enough to allow operators to easily carry them, and could be used anywhere along the pullcord. With these advantages in mind, other variations and advantages to the described embodiments are also possible. None of these potential variations or changes should be used to change the scope and spirit of my invention which is to be limited only by the claims that follow.

I claim:

1. A combined lockout safety device useable with the pullcord of a conveyor comprising:
    a power driven movable conveyor having a pullcord extending along its length to operate a switch connected thereto, said switch being capable of shutting off the power source for the conveyor and the movement of the conveyor;
    a portable device to tension the pullcord anywhere along its length to actuate the switch and render the conveyor inoperative, said device comprising two pairs of elongated members with each pair having two parallel members joined by a retractable pin, said pairs being joined to each other near one end by a pivot pin whereby the pullcord is engaged between the parallel members and cammed by the retractable pins and the pivot pin to tension the pullcord; and
    means for locking said device in its tensioned position with respect to the pullcord, said means being mounted near the ends of both pairs of their respective parallel members remote from the joining pivot pin.

* * * * *